United States Patent [19]

Newman

[11] 4,227,175

[45] Oct. 7, 1980

[54] DATA RECOGNITION APPARATUS

[75] Inventor: Eric L. Newman, Eastleigh, England

[73] Assignee: International Business Machines Corporation, Armonk, N.Y.

[21] Appl. No.: 3,551

[22] Filed: Jan. 15, 1979

[30] Foreign Application Priority Data

Jan. 18, 1978 [GB] United Kingdom ............... 02045/78

[51] Int. Cl.³ ............................................. G06F 11/08
[52] U.S. Cl. ..................... 340/146.2; 340/146.3 WD;
364/728; 364/821; 371/69
[58] Field of Search ................... 340/146.1 R, 146.2,
340/146.3 WD; 364/728, 821, 862; 325/42,
323; 371/31, 69

[56] References Cited

U.S. PATENT DOCUMENTS

| | | | |
|---|---|---|---|
| 3,463,911 | 8/1969 | Dupraz et al. | 340/146.1 R |
| 3,696,203 | 10/1972 | Leonard | 340/146.1 R |
| 3,855,576 | 12/1974 | Braun | 340/146.3 WD |
| 3,961,171 | 6/1976 | Freeman | 364/728 |
| 4,006,454 | 2/1977 | Beseke et al. | 340/146.1 R |
| 4,103,333 | 7/1978 | Poirier et al. | 364/862 |
| 4,110,737 | 8/1978 | Fahey | 340/146.2 |
| 4,169,286 | 9/1979 | Uzunoglu et al. | 364/821 |

*Primary Examiner*—Charles E. Atkinson
*Attorney, Agent, or Firm*—Nathan N. Kallman

[57] ABSTRACT

Data recognition apparatus includes a temporary storage to hold three data bits, a readable storage to store eight different sequences which are expected to occur, and a comparison means to find the closest match of the contents of the temporary storage with the readable storage at each bit time. Error detection and error correction are realized as each bit is recognized three times sequentially. The apparatus may use surface acoustic wave and charge coupled device filter banks, and analog to digital conversion plus data processor comparison.

14 Claims, 18 Drawing Figures

FILTER BANK CHANNEL

SAW DEVICE

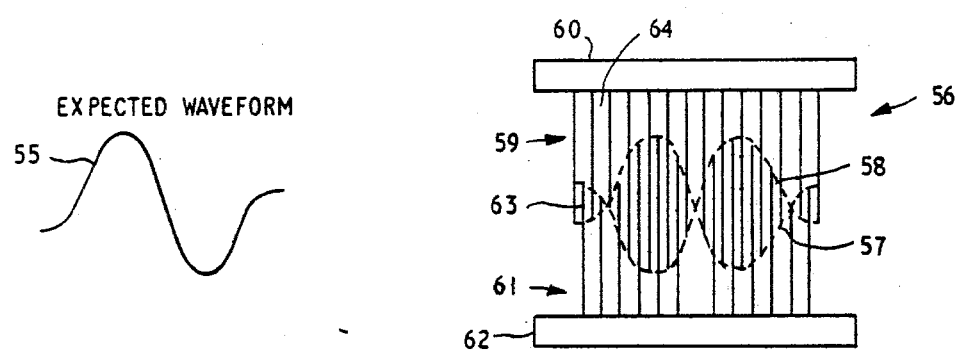
FIG. 7   PERSONALISED SAW DEVICE
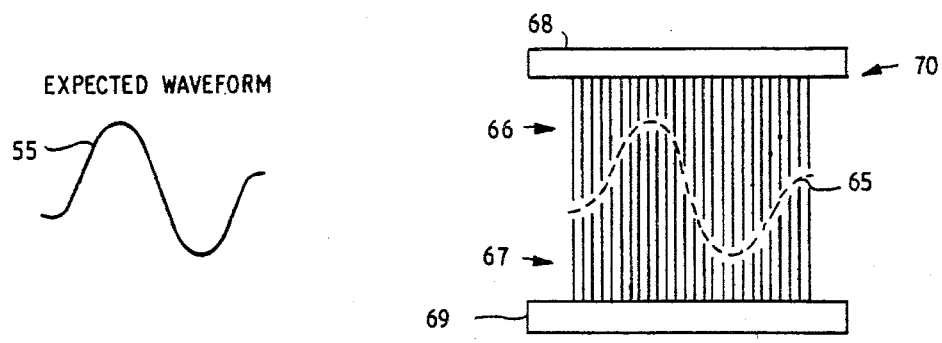
FIG 8   PERSONALISED CCD DEVICE

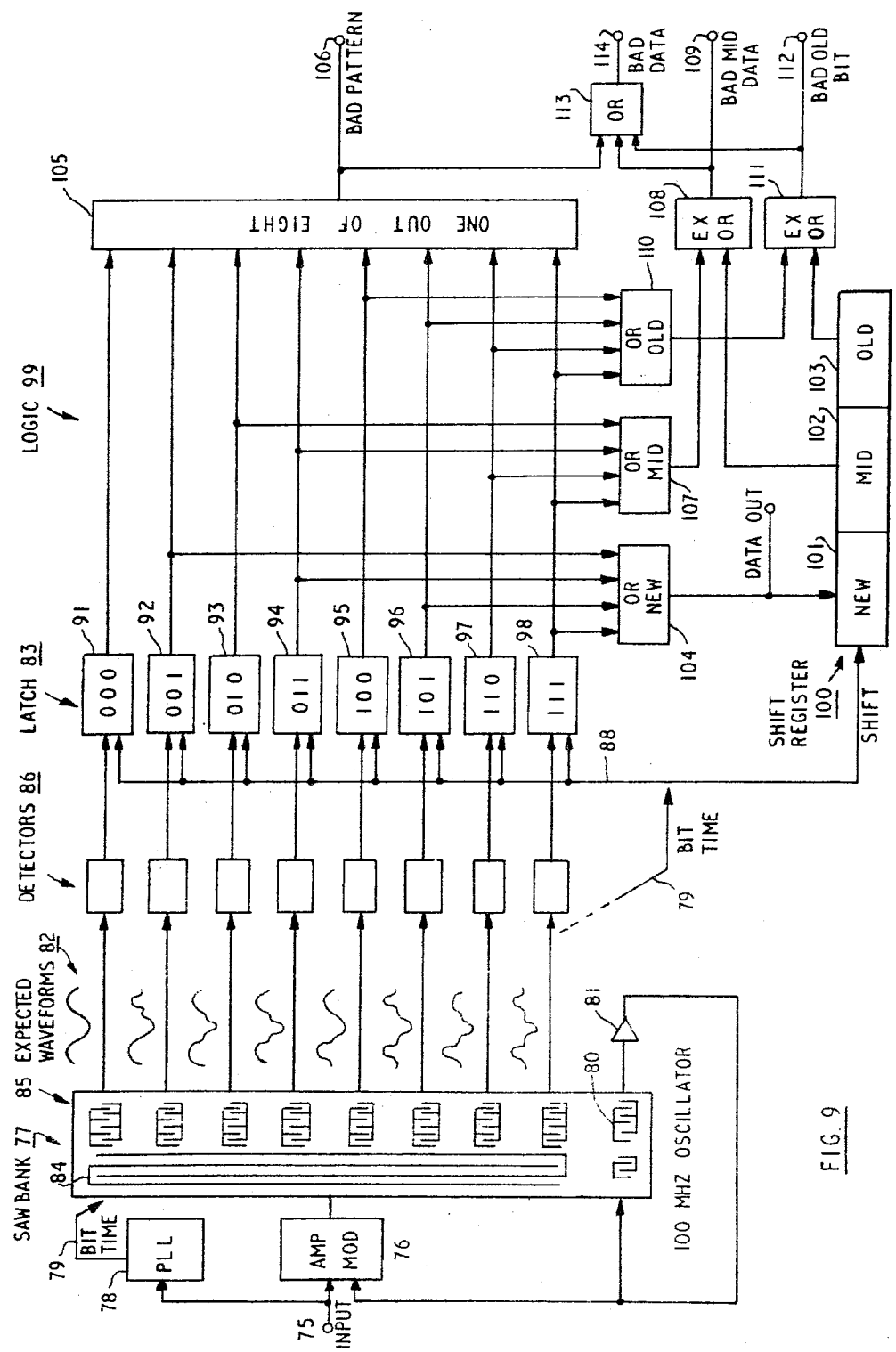

| SEQUENCE REFERENCE NO | BINARY SEQUENCE | FOLLOWING SEQUENCE |
|---|---|---|
| 0 | 000 | 0,1 |
| 1 | 001 | 2,3 |
| 2 | 010 | 4,5 |
| 3 | 011 | 6,7 |
| 4 | 100 | 0,1 |
| 5 | 101 | 2,3 |
| 6 | 110 | 4,5 |
| 7 | 111 | 6,7 |

FIG. 10A

TIME

| | |
|---|---|
| INPUT BINARY | 0 1 0 1 1 1 1 0 0 0 1 0 |
| SEQUENCE RECOGNISED | 2 5 3 7 7 6 4 0 1 2 |
| POSSIBLE FOLLOWING SEQUENCES | 4 2 6 6 6 4 0 0 2 4<br>5 3 7 7 7 5 1 1 3 5 |

FIG. 10B

FIG. 16   SAW BANK ARTWORK

DATA RECOGNITION APPARATUS

DESCRIPTION

1. Technical Field

This invention relates to data recognition apparatus, and in particular, to apparatus wherein data waveforms generated by magnetic heads which read record tracks on magnetic disk files are recognized.

An object of this invention is to provide an improved apparatus and method of recognizing digital data.

2. Background Art

This invention relates to data recognition apparatus which has particular application for the recognition of data waveforms generated by heads reading recorded tracks on magnetic disk files or tape units. Implementation may be by various technologies, e.g., surface acoustic wave (SAW) devices, charge coupled (CCD) devices, or by digital processor techniques.

Surface acoustic wave (SAW) devices are also well known and their applications are reviewed in "Surface-acoustic-wave component devices and applications" J. D. Maines and E. G. S. Paige, Proceedings IEE, Volume 120, No. 1OR, October 1973, IEE Reviews. The article in Electronics and Power (IEE) by D. W. Parker of May 1977, pages 389 to 392 entitled "Acoustic-Surface-Wave Band Pass Filters" provides a useful introduction to SAW devices.

In the prior art, U.S. Pat. No. 3,680,007, entitled "Surface Wave Transducer for Digital Signals," proposes a transducer for processing surface wave pulses having parallel and angled electrodes. In this patent, FIG. 6 shows a pair of input transducers and a pair of receiving transducers phased and spaced so that when a predetermined three digit input sequence is applied to the input transducers, the receiving transducers produce a maximum output signal. It is stated that the arrangement described is designed to perform a binary sequence pattern recognition.

A somewhat similar operation, but in a frequency domain, rather than in a time domain is described in U.S. Pat. No. 3,376,572 entitled "Electroacoustic Wave Shaping Device." FIG. 5 of this patent shows a radar system in which a transmitter produces single peak delta pulses for application to a SAW wave shaping encoder. This encoder produces a linearly frequency swept wave for transmission by a radar antenna. Echo pulses received by the antenna are processed by a SAW decoder to produce a single peak pulse.

Another article of interest is by J. H. Collins and P. M. Grant entitled "The role of surface acoustic wave technology in communication systems" published in Ultrasonics, March 1972, pages 59 to 71. In particular, this article is concerned with the M-ary communication system (pages 65, 66) in which coded data is represented in the time domain by a long biphase constant amplitude coded sequence including redundancy. A plurality of these sequences are fed to a bank of SAW devices to detect which of the coded sequences is present. A similar system in the frequency domain is also described (page 66—frequency hopped modem).

A recent review article entitled "Charge Coupled Devices for Analog Signal Processing" by D. D. Buss, C. R. Hewes, M. deWitt and R. W. Brodersen, published in IEEE International Symposium on Circuits and Systems 1977 is of interest as it provides background information on CCD transversal filters.

SUMMARY OF THE INVENTION

According to the present invention, data recognition apparatus is responsive to a serial input waveform, the input waveform including N different possible overlapping waveform sequences, each waveform sequence representing a plurality of m binary data bits, and having a period of m equal, or substantially equal bit times. The apparatus comprises temporary storage means for the input waveform having sufficient capacity to temporarily store any one of said waveform sequences, readable storage means for storing representations of N different waveform sequences expected to occur in the input waveform, and comparison means operable during each bit time to compare the contents of said temporary storage means with the contents of said readable storage means and to indicate the closest match between each input waveform sequence and said expected waveform sequences.

According to another aspect, a method of recognizing data, which is represented by a serial input waveform including N different possible overlapping waveform sequences, each waveform sequence representing a plurality of m binary bits, and having a period of m equal, or substantially equal bit times, comprises the steps of temporarily storing the input waveform in temporary storage means having sufficient capacity to store any one of said waveform sequences, storing in readable storage means representations of N different waveform sequences expected to occur in the input waveform, comparing during each bit time the contents of said temporary storage means with the contents of said readable storage means, and indicating the closest match between each input waveform sequence and said expected waveform sequences.

BRIEF DESCRIPTION OF THE DRAWING

The invention will be described in greater detail with reference to the drawings in which:

FIG. 7 illustrates schematically a SAW device personalized by an expected waveform.

FIG. 8 illustates schematically a CCD device personalized by an expected waveform.

FIG. 9 shows a SAW data channel embodying the present invention, illustrating a portion of FIG. 3 in more detail.

FIG. 10A lists the binary sequences used in FIG. 9, together with possible following sequences.

FIG. 10B shows the following sequences of FIG. 10A applied to input binary.

DISCLOSURE OF THE INVENTION

In conventional magnetic recording devices, the surface material of a magnetic disk is saturated in alternate directions by a recording head to provide a magnetically recorded track.

Modern, high density magnetic storage devices are designed to pack as much data onto a specific area of magnetic surface as possible. This results in a large number of narrow tracks. Thus, the distance between the magnetic boundaries becomes distorted and badly defined relative to each other. The head which reads the magnetic tracks also smears the information from the magnetic boundaries. This is because there are finite mechanical and electrical characteristics associated with the head which cannot be reduced due to technological and absolute limitations. Such characteristics are: head gap width, distance of head from magnetic surface, head not exactly over the track, head capacitance and head inductance. The readback signal waveform, from a high density recording track, will normally look more like a series of distorted sinusoids, rather than well defined separate rectangular pulses which could be expected from an ideal system.

Figure 1:
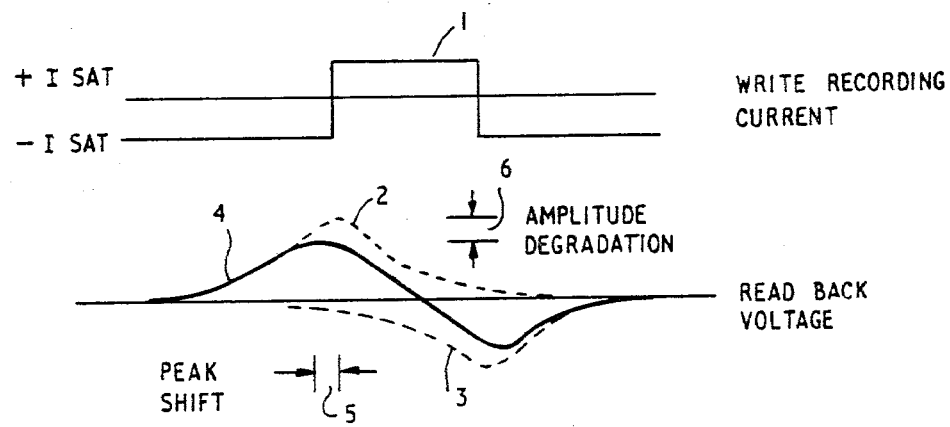
FIG. 1 illustrates waveform degradation due to magnetic recording and readback.

FIG. 1 illustrates the waveform degradation due to magnetic recording and readback. A write recording current 1 is shown which is initially −I saturation, to saturate the magnetic recording surfaces in one direction, abruptly changes to +I saturation, to saturate the magnetic surface in the opposite directions and then finally returns to −I saturation.

If these magnetic transitions were sufficiently spaced apart to avoid interaction, the read back voltages 2 and 3 would be of Gaussian shape. However, the magnetic transitions are closely spaced with resulting voltage waveform degradation. To a first approximation the readback voltage waveform 4 is the superposition of the voltages 2 and 3. The major effect of closely packing magnetic transitions is peak shift 5 from coincidence with a magnetic transition and amplitude degradation 6. Also, voltages 2 and 3 do not add according to linear superposition.

Other effects which distort the readback voltage waveform are adjacent track interference, noise, magnetic surface imperfections and variation in surface speed or flying height of the record/read head. The resulting voltage waveform 4 is thus one from which it is very difficult to extract the positions of the originally recorded magnetic transitions.

Present day magnetic disk decoding channels include electronic circuitry designed to reconstruct the positions of the originally recorded magnetic transitions. In this circuitry the voltage read waveform is processed one transition at a time. The more sophisticated channels utilize precision phase locked oscillators, differentiators, peak detectors and sometimes integrators. The circuitry may detect voltage peaks, zero crossings and waveform hysteresis. However, the difficulties of recovering data represented by magnetic transitions from read waveforms imposes a limit upon the packing density of magnetic transitions, and thus upon the maximum data rate.

Figure 2:
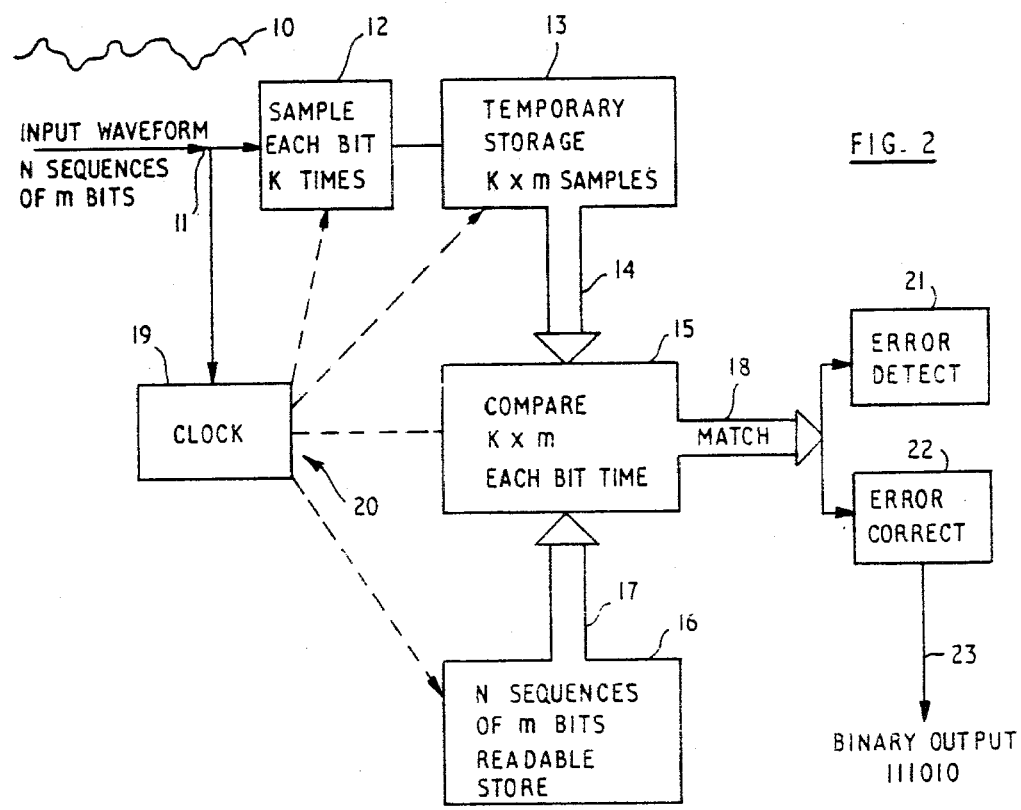
FIG. 2 is a block diagram illustrating schematically the functions required by embodiments of the present invention.

Thus the conventional method of recognizing the readback signal in terms of the original recording signal consists of a point by point analysis of the waveform produced by an individual magnetic transition based upon the detection of a discrete criterion such as zero crossing or peak detection. Embodiments of the present invention use a different method in which the readback signal is analyzed by recognizing the effect upon the waveform of a sequence of magnetic transitions. Thus every possible waveform sequence must be analyzed simultaneously. For example, if three magnetic transitions representing three binary bits is the sequence chosen for recognition, then there will be eight possible waveform sequences to be recognized. FIG. 2 illustrates schematically, in block form, functions required by embodiments of the present invention. It should be noted that in a particular hardware embodiment, some of these functions may be integrated into a single device.

In FIG. 2 an input data signal 10 for recognition is a time domain waveform in which the shape of amplitude variations represent binary bits. The particular coding shown is 111010. In general terms the input waveform is processed by recognizing it in overlapping sequences of m binary bits. As all possible different overlapping sequences of m bits must be recognized, there will be N possible unique sequences. For example, if there are 3 bits in sequence, $N=8$, i.e., $N=2^m$, assuming all may be present. This relationship will normally apply for other values of m and N unless some particular binary sequences are for some reason not used.

Input signal 10 on line 11 is fed to circuit 12 which continuously samples the amplitude of input signal 10, K times for each bit. These amplitude samples are temporarily stored in storage 13. The storage capacity of temporary storage 13 must be at least sufficient for a complete sequence of m bits. Each complete m bit sequence of $K \times m$ sampled amplitudes are fed by line 14 to compare circuit 15 each bit time.

Readable store 16 stores a template representing the N expected sequences of m bits; i.e., it stores a vocabulary of N words each having m bits and each bit with K values. The contents of readable store 16 are read out each bit time on line 17 to compare circuit 15. Thus at each bit time, compare circuit 15 is presented with K.m samples of the actual input waveform from temporary storage 13 and templates representing the N words each having K.m values. Compare circuit 15 compares the actuak K.m samples with the expected N words of K.m values and indicates by Match Compare 18 which of the expected K.m values is the closest match. Match Compare 18 may be a signal on one out of N lines.

The apparatus of FIG. 2 requires synchronization. Assuming that the input waveform 10 has variable timing, the timing of each bit time must be extracted from waveform 10 on line 11 by clock 19. When the input waveform is a readback signal from a magnetic disk, clock 19 may be a phase locked oscillator. Bit timing generated by clock 19, is distributed at output 20 as required to sample circuit 12, temporary storage 13, compare circuit 15 and readable store 16.

Match Compare 18 may be fed to logic circuitry Error Detection 21 and Error Correction 22 producing binary output 23. These logic functions are presented with a Match Compare 18 for each bit time, each of which represents a sequence of m bits. Thus taking input 10 showing 111010 as an example, Match Compare will represent sequentially 111, 110, 101, 010, 10X. As these binary sequences overlap and only one bit changes from one sequence to the next, logic provides Error Detection 21 and Error Correction 22. In general terms, each recognized bit occurs in each of m successive sequences.

As an example of error correction, assume the second bit sequence is 111, then as the next bit sequence is 101 rather than 111, the incorrect third bit 1 occurs in the two following sequences 101 and 010 and a 0 may be confirmed by Error Correction 22.

As a less trivial example, assume that match compare 18 is missing for the third bit sequence 101. As the data provided for Error Correction 22 is redundant, i.e., when there are no errors, each individual bit occurs in three successive sequences, a missing bit sequence may be predicted as shown in the table below. Each column represents one bit time, and as each individual bit occurs in three successive sequences, under error free conditions, each column will contain three 1's or three 0's.

|   |   |   |   |   |   |
|---|---|---|---|---|---|
| 1 | 1 | 1 |   |   |   |
|   | 1 | 1 | 0 |   |   |
|   |   | ? | ? | ? |   |
|   |   |   | 0 | 1 | 0 |
|   |   |   |   | 1 | 0 | X |

From this sequence it is clear that the missing sequence ? ? ? is most likely to be 1 0 1. The logic design for such error detection and error correction will not be detailed, as it is within the competence of any logic designer skilled in the art.

Figure 3:
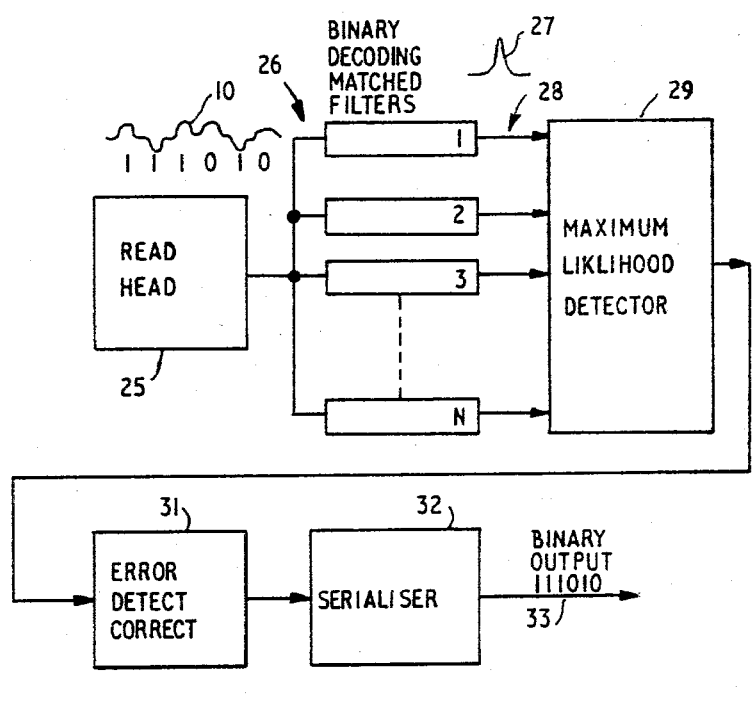
FIG. 3 is a block diagram of an embodiment of the present invention using a bank of matched filters.

FIG. 3 illustrates an embodiment of the present invention using a bank of matched filters. A read head 25 in a magnetic disk file provides an input waveform 10 representing binary 111010 to a bank of Binary Decoding Matched Filters 26. It is assumed as previously that the number m of binary bits in each waveform sequence is 3 and so the number N of possible unique sequences is 8. Each matched filter is made to respond to a predetermined input waveform sequence by producing a single output pulse 27. There are thus N matched filters which in the present example is 8.

When an input waveform 10 is applied, each waveform sequence representing 3 binary bits will produce a single pulse 27 on one of the lines 28. This single pulse 27 will occur every bit time. Lines 28 are taken to Maximum Likelihood Detector 29, which detects which of the lines 28 carries the most significant pulse 27 to identify the most likely binary sequence present out of the 8 possible sequences.

This most likely sequence is fed to Error Detector/Corrector 31 which decodes to binary bits and includes storage to retain the last two binary sequences detected. Logic is included, as explained earlier with reference to FIG. 2, to compare the last two sequences with the latest sequence to perform error detection and error correction. Finally Serializer 32 assembles the corrected binary sequences into a serial binary data output 33. As with FIG. 2 a clock is needed to synchronize the operation of FIG. 3.

The bank of matched filters may be implemented by any technology which is capable of storing and processing waveforms in the time domain, such as input waveform 10. The preferred technology is surface acoustic wave (SAW) devices, although charge coupled (CCD) devices may be used.

SAW devices will be described, as CCD devices are closely analogous. In a SAW device, Temporary Storage 13 is performed by launching input waveform 10 as a surface acoustic wave in a suitable medium to provide a delay of at least m bits. Readable Store 16 for N sequences of m bits becomes filter bank 26 consisting a N saw matched filters each of which is made to respond to one only of the sequences. Compare Circuit 15 performs the comparison by the integration of the surface acoustic wave with the fingers of the SAW devices. The closest match (i.e., match compare 18) is indicated by the single pulse 27.

Figure 4:
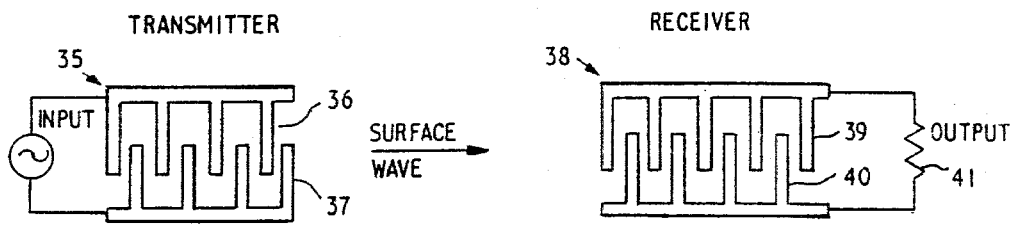
FIG. 4 shows a surface acoustic wave (SAW) device.

A surface acoustic wave (SAW) device is illustrated in FIG. 4. A SAW device is essentially a delay line formed on a surface of a piezoelectric crystal along which an acoustic wave may travel. An input signal is applied to a transmitter 35 in the form of a pair of metal patterns on the surface of the crystal having interdigital fingers 36, 37. Transmitter 35 generates two surface waves in a direction normal to fingers 36, 37, one towards a receiver 38, and another in the opposite direction which is not required and is absorbed. Receiver 38 is another similar metal pattern with interdigital fingers 39, 40. When a surface wave is received by receiver 38 an output signal voltage is generated in a suitable load 41.

The surface wave generated by transmitter 35 travels as a homogenous beam having the width of the transmitter pattern. As the speed of the surface wave is about $10^5$ times slower than the speed of light i.e., a 3 $\mu$sec long signal which occupies 1 Km as an electromagnetic wave is compressed into 1 cm as a surface acoustic wave. Thus as the surface acoustic wave travels relatively slowly it is feasible to store a waveform from a magnetic disk file representing several bits under the receiver pattern 38 at any one time. The receiver 38 may have, say one hundred finger pairs 39, 40 and may be regarded as a matched filter.

Figure 5:
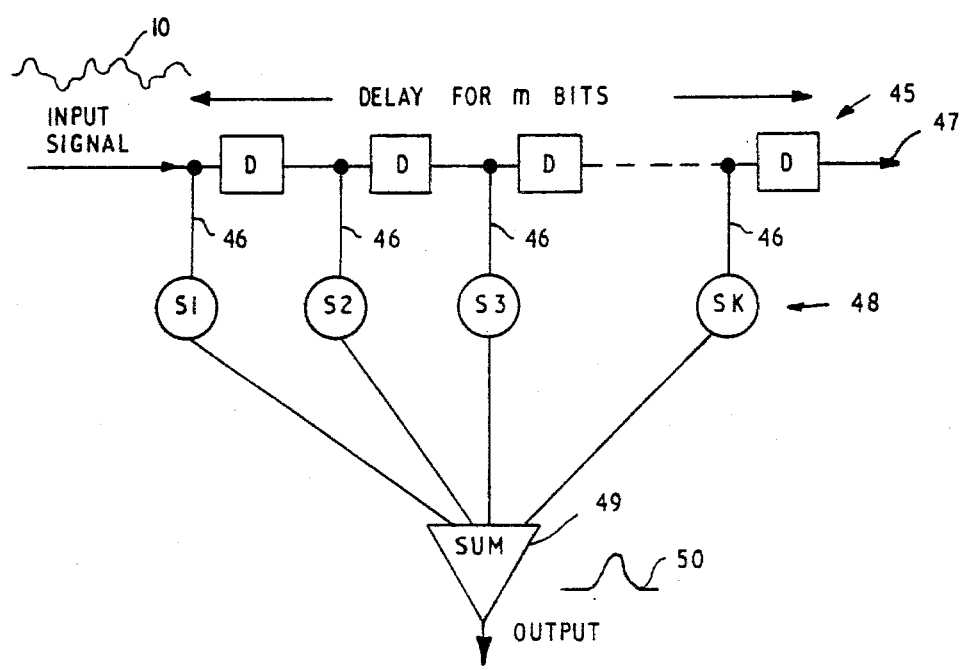
FIG. 5 illustrates the function of a SAW device in the present invention.

FIG. 5 represents schematically the operation of a surface acoustic wave (SAW) device which is essentially a delay line where the input signal 10 travels along the surface of a piezoelectric crystal in the form of a mechanical wave. The wave is transmitted by a metal pattern on the surface (not shown) and is received by another metal pattern. These metal patterns have interdigital fingers. Every pair of fingers can be regarded as a tap 46 with a delay D between each tap. As it is required to sample each of m input bits K times there will be m.K pairs 36, 37 of fingers. The overlap of the fingers is proportional to the amount of signal received from the delay line.

With SAW devices (or CCD devices), the only signal processing functions that can be performed are scaling and adding as illustrated in FIG. 5. The SAW device is equivalent to a delay line consisting of K delays D indicated generally by 45, where K is the number of finger pairs 46. Input signal 10 in the form of a surface wave travels through delays D and is absorbed at 47 to avoid reflections. The electrical load on finger pairs 46 is mismatched so that little energy is coupled into the fingers and the surface wave suffers only a very small attenuation. The total delay K.D is equal to the delay of one complete input waveform sequence representing m binary bits, i.e., the delay line temporarily stores one complete input waveform sequence.

Scalers 48, designated S1 to SK, each pass a predetermined portion of the signal 10 passing through the delay line to a SUM device 49. The predetermined portion of each scaler 48 is determined by the overlap of individual finger pairs 46 in accordance with an expected waveform sequence. The outputs of scalers 48 are added by SUM 49 to produce an output signal 50. With SAW devices the addition is performed by commoning fingers as shown in FIG. 4.

Thus, as shown in FIG. 5, a SAW device will sample input waveform 10 at K discrete points (i.e., at K time intervals D), scale each sample by a scale factor S, and add the resultants to produce an output signal 10. A suitable value of K for an input waveform sequence representing 3 bits is 40 to 100.

A reasonable algorithm for recognizing a particular expected waveform sequence is to convolute the expected waveform with itself. That is, at each discrete time interval D the whole input waveform 10 is multiplied by a selected expected waveform sequence. The result is that if the input waveform 10 corresponds to or matches the selected expected waveform sequence, then as the waveform passes through the delay line, the output signal will increase from a small value (ideally zero) to a peak value when the waveform occupies the whole delay line, and then decreases to a small value (ideally zero).

When the input waveform 10 does not correspond to (i.e., does not match) the selected expected waveform, the output signal will remain at a relatively low value as compared to the peak of output 50 as the waveform passes through the delay line.

Figure 6:
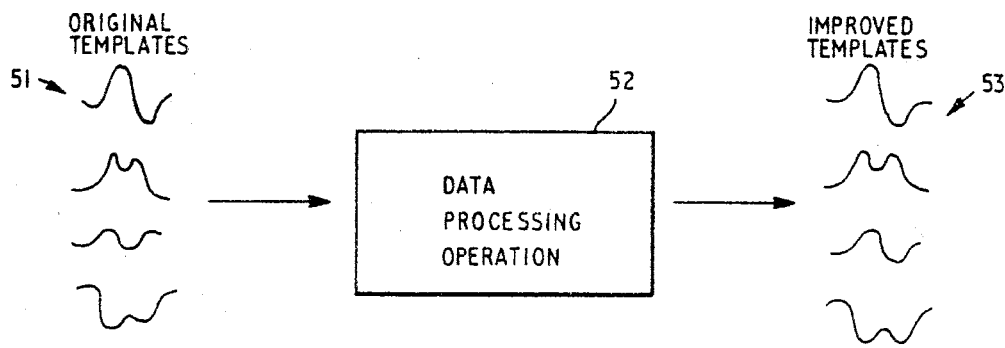
FIG. 6 illustrates schematically the preparation of templates of expected waveforms for improved recognition.

When the simple algorithm previously mentioned gives insufficient discrimination between expected waveforms, more sophisticated algorithms may be used as illustrated schematically in FIG. 6. The original expected waveforms or templates 51 are subjected to a data processing operation 52 to generate improved versions or templates 53 of the expected waveforms. Data processing operation 52 involves processing all the original waveform shapes and exaggerating the differences. This processing provides improved discrimination between waveform sequences and facilitates recognition.

When expected waveforms have been determined, each is used to personalize a SAW device as illustrated schematically in FIG. 7. This figure shows an expected waveform 55 together with a SAW device 56. As explained earlier the time delay through the SAW device is of such length as to accommodate a complete expected waveform. It is assumed that the input waveform is modulated at a high frequency, and thus finger spacing is related to the modulation frequency.

Two dashed lines appear on the figure, line 57 which is of similar shape to expected waveform 55 and line 58 which is of similar shape to a mirror image off expected waveform 55. For ease of illustration the SAW fingers are shown as single lines, and only a few fingers are shown, although a practical SAW device would contain many more. Fingers 59 from upper electrode 60 and fingers 61 from lower electrode 62 are in pairs with overlapping ends 63 formed by terminating fingers 59 and 61, either on dashed lines 57 or 58. Thus, the overlapped ends 63 form a shape along the device whose vertical amplitude is proportional to expected waveform 55. A SAW device as described is suitable for use as a binary decoding matched filter as shown in FIG. 3.

It will be noted that a phase change in lines 57, 58 is accompanied by a pair of fingers in the same direction as at 64.

A CCD (charge coupled) device 70 may be employed in a similar manner, as shown schematically in FIG. 8. The expected waveform 55 is again assumed and the same waveform shape appears as dashed line 65. Each pair of vertical sensing fingers 66, 67 form a gap at dashed line 65 and extend above a charge storage cell (not shown).

As is well known in the CCD art, additional electrodes (not shown) are required to shift stored charge along the delay line formed by adjacent cells. There are $K \times m$ cells for $K \times m$ samples of the input waveform as in FIG. 2. Sensing fingers 66 are connected to upper summing bus 68 and sensing fingers 67 are connected to lower summing bus 69. The function of this CCD device is analogous to that of the SAW devices described earlier. When a shift signal is applied to summing buses 68, 69 the differential current flow provides the required output signal. However the output signal will not be a continuous curve as for a SAW device but will be formed of discrete steps.

FIG. 9 shows a SAW Data Channel illustrating a portion of FIG. 3 in more detail. An input waveform from a magnetic disk read head is fed on line 75 to Amplifier Modulator 76 which supplies an input to SAW matched filter Bank 77. Input line 75 is also connected to a Phase Locked Loop (PLL) 78 which synchronizes with the input waveform to extract Bit Time 79. Included on the same substrate as SAW Bank 77 is a 100 MH$_Z$ SAW Oscillator 80 in a feedback loop with amplifier 81. The oscillator output is connected to Amplifier Modulator 76 which modulates the input to SAW Bank 77 at 100 MH$_Z$. This modulation enables the SAW devices to operate with a large (greater than 50%) input bandwidth. The width of the fingers and the spacing between fingers is a quarter wavelength of the modulation frequency.

As for FIG. 3, the number of binary bits m represented by a waveform sequence is 3 and thus there are eight Expected Waveforms shown schematically at 82. SAW Bank 77 includes a common input transducer which launches a common surface acoustic wave to eight SAW matched filters 85. Each individual output of these SAW filters 85 is passed through a respective threshold Detector 86. The output of each Detector 86 sets one of latches numbered 91 to 98 each of which is reset on line 88 by Bit Time 79.

As each SAW filter 85 is designed to recognize its associated Expected Waveform 82, under error free conditions only one of the latches is set at each bit time. The binary number associated with each latch 83 means that at a bit time when its associated latch is set, its corresponding expected waveform 82 has been detected.

As an example, below is a 7 bit binary sequence representative of an input waveform, followed by the time sequence in which the latches are set.

| Binary Sequence | 1 | 1 | 1 | 0 | 1 | 0 | 0 | |
|---|---|---|---|---|---|---|---|---|
| First Bit Time | 1 | 1 | 1 | | | | | Latch 98 set |
| Second Bit Time | | 1 | 1 | 0 | | | | Latch 97 set |
| Third Bit Time | | | 1 | 0 | 1 | | | Latch 96 set |
| Fourth Bit Time | | | | 0 | 1 | 0 | | Latch 93 set |

-continued

| | | | |
|---|---|---|---|
| Fifth Bit Time | 1 0 0 | Latch 95 set | |

It is clear from this example, that each binary bit is sensed three times in sequence. A New bit is sensed firstly as the right hand of three bits. At the next bit time the New bit becomes the Mid bit and at the following bit time the Mid bit becomes an Old bit as it is sensed for the last time.

Logic 99 effectuates this triple detection of each bit. Shift register 100 stores 3 bits and has a New bit stage 101, a Mid bit stage 102 and an Old bit stage 103. Bit Time 79 shifts the register to the right each bit time as each New bit becomes available. The New bit is fed to New bit stage 101 via OR NEW 104 from Latch 92, 94, 96 or 98. During the next bit time, the New bit in stage 101 is shifted to the right to become the Mid bit in Mid bit stage 102. At the next bit time it becomes the Old bit in OLD bit stage 103.

The outputs from latches 91 to 98 are fed to ONE OUT OF EIGHT logic block 105 which generates an output signal BAD PATTERN at terminal 106 when either no signal or more than one signal occurs during a bit time on the eight input lines.

The Mid bit at each bit time is generated by OR MID 107 which receives inputs from latches 93, 94, 97 and 98. This latest Mid bit is compared to the Mid bit in stage 102 of shift register 100 by exclusive OR 108. When the two bits are not the same, an output BAD MID BIT appears at terminal 109.

Similarly the Old bit at each bit time is generated by OR OLD 110 which receives inputs from latches 95, 96, 97 and 98. This latest OLD bit is compared to the OLD bit in stage 103 of shift register 100 by exclusive OR 111. When the two bits are not the same an output BAD OLD BIT appears at terminal 112.

OR 113 receives the BAD PATTERN MID BIT or OLD BIT signals and generates an error detection signal BAD DATA at terminal 114.

As in FIG. 9 an output of any latch 91 to 98 represents three binary bits, an output occurs at each bit time, and each binary bit is sensed three times. Thus, error correction logic techniques can predict the binary representation of a missing output from the latches.

FIG. 10A shows the eight possible binary sequences 000 through 111 which are used in FIG. 9 with reference numbers 0 through 7. Also shown are the possible following sequences. It should be noticed that after a particular sequence, there are only two sequences that can follow. For example, if a sequence 011 (Ref. No. 3) was recognized then the following sequencing must be 110 (Ref. No. 6) or 111 (Ref. No. 7).

FIG. 10B shows a random binary input, the three bit binary sequence recognized and the possible following sequences at each bit time. For example, the binary input starts with 010 which is sequence Ref. No. 2 so the possible following sequences are Ref. Nos. 4 or 5. In the binary input the latter follows, i.e., 101. The concept of possible following sequences is due to the fact that each individual bit should be recognized three times which enables single bit error to be carried out.

Error correction is particularly important for an input waveform from a magnetic disk file or tape unit read head. One of the problems with increasing magnetic recording density is that such things as imperfections in the magnetic surface, dust and electromagnetic noise become significant because of the hard/soft error which may be created. Imperfections are possibly the most important as an error resulting from these is hard. This is normally avoided by not using defective tracks and employing spare tracks. This is undesirable because the overall density is reduced. Thus bit error recovery would alleviate these problems.

Figure 11:
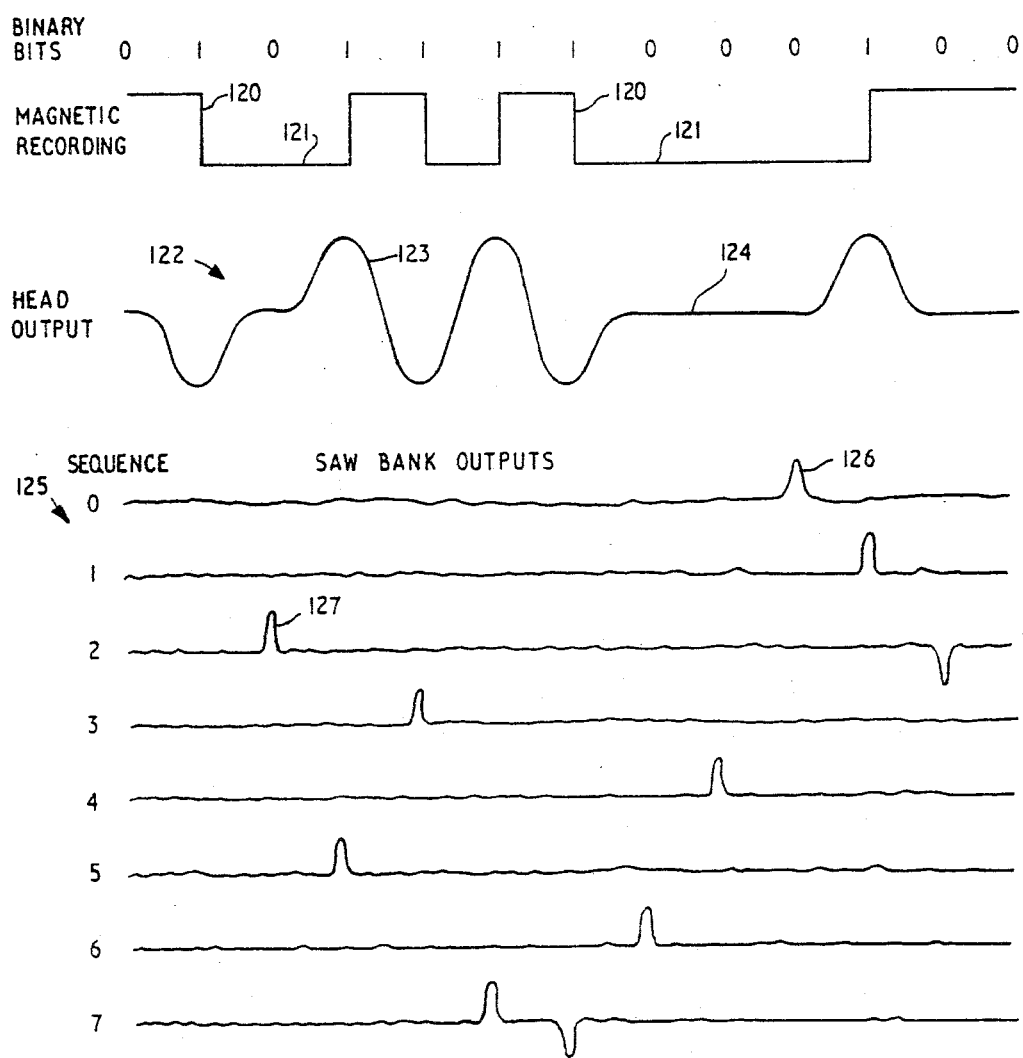
FIG. 11 illustrates schematically waveforms in the data channel of FIG. 9 when processing the data of FIG. 10B.

FIG. 11 illustrates schematically waveforms in the data channel of FIG. 9 when processing the data of FIG. 10B. In this diagram the top line of binary bits represents the coding on a magnetic disk. Direct magnetic recording is assumed, i.e., a transition 120 represents a 1 bit, while not transition 121 represents a 0 bit. The output signal from a read head is shown generally at 122 in which a peak 123 represents a 1 bit and the absence of a peak a 0 bit.

In the lower part of the diagram eight output waveforms 125 are shown designated as in FIG. 10B. Sequence 0 through 7 corresponds to the waveforms fed to latches 91 through 98 in FIG. 9 from SAW bank 77. It will be noted that at any one bit time, only one SAW bank output is produced. For example, the binary input starts 010 and thus sequence 2 is recognized to produce a pulse 127. Later the input is 000 which is sequence 0 producing pulse 126. It should be noted that the expected waveforms 82 of FIG. 9 are not used in FIG. 11.

The design of the SAW transducers 85 shown in FIG. 9 will now be described briefly with reference to FIGS. 12, 13, 14 and 15.

Assume that the input signal 75 is to be recognized 3 bits at a time, then there will be eight different expected waveforms or templates (2 to the power 3). Convoluting a waveform with itself is accomplished by making the impulse response of the convoluting device the same as the waveform. With a surface acoustic wave (SAW) device, this is done by making the envelope of finger overlaps the same shape as the required waveform as in FIG. 7.

For each bit pattern the following procedure is performed to produce a template or expected waveform.

Figure 12:
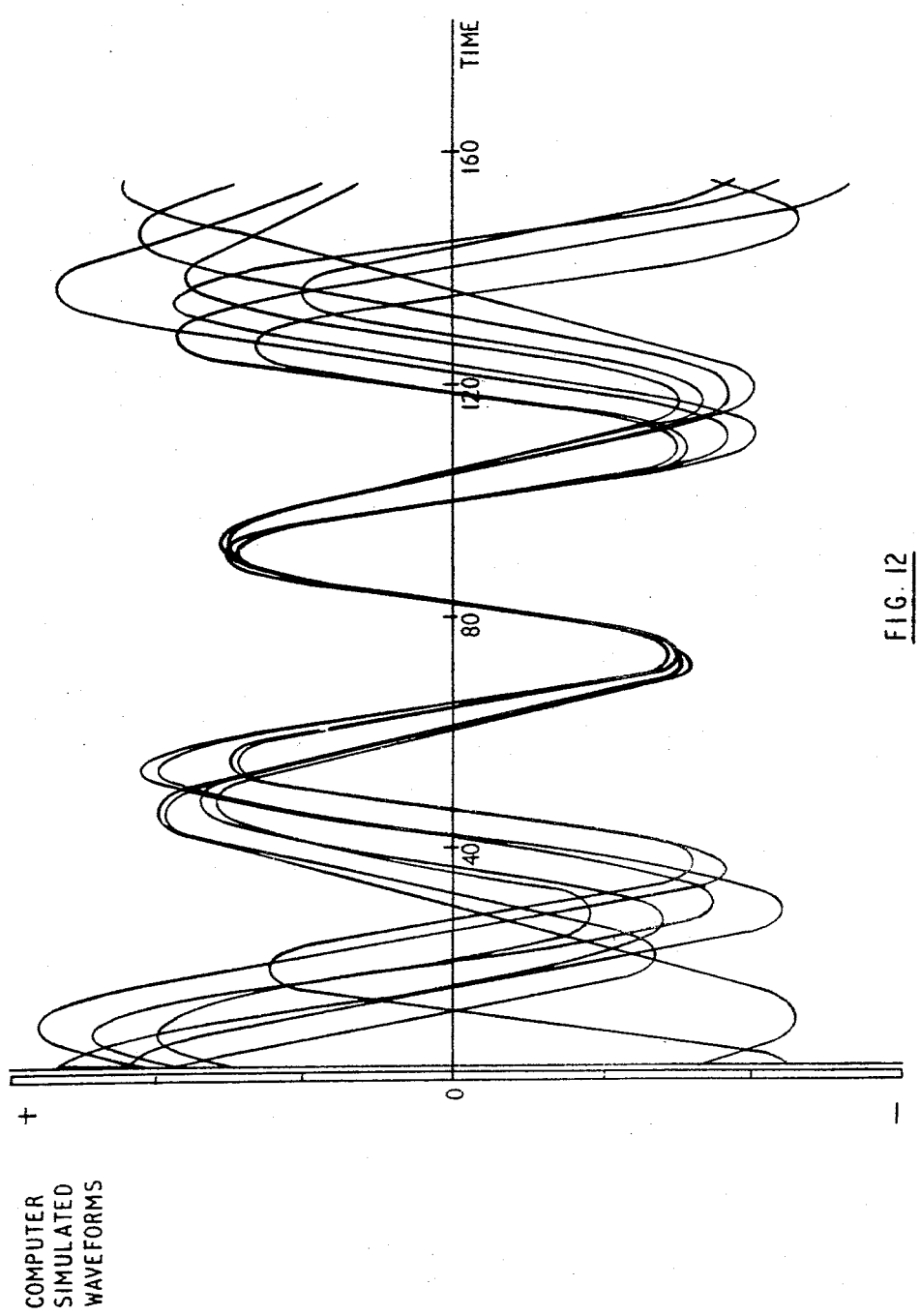
FIG. 12 shows computer simulation of all possible waveforms associated with a single input sequence from a magnetic disk head due to distorting effects of adjacent waveforms.
Figure 13:
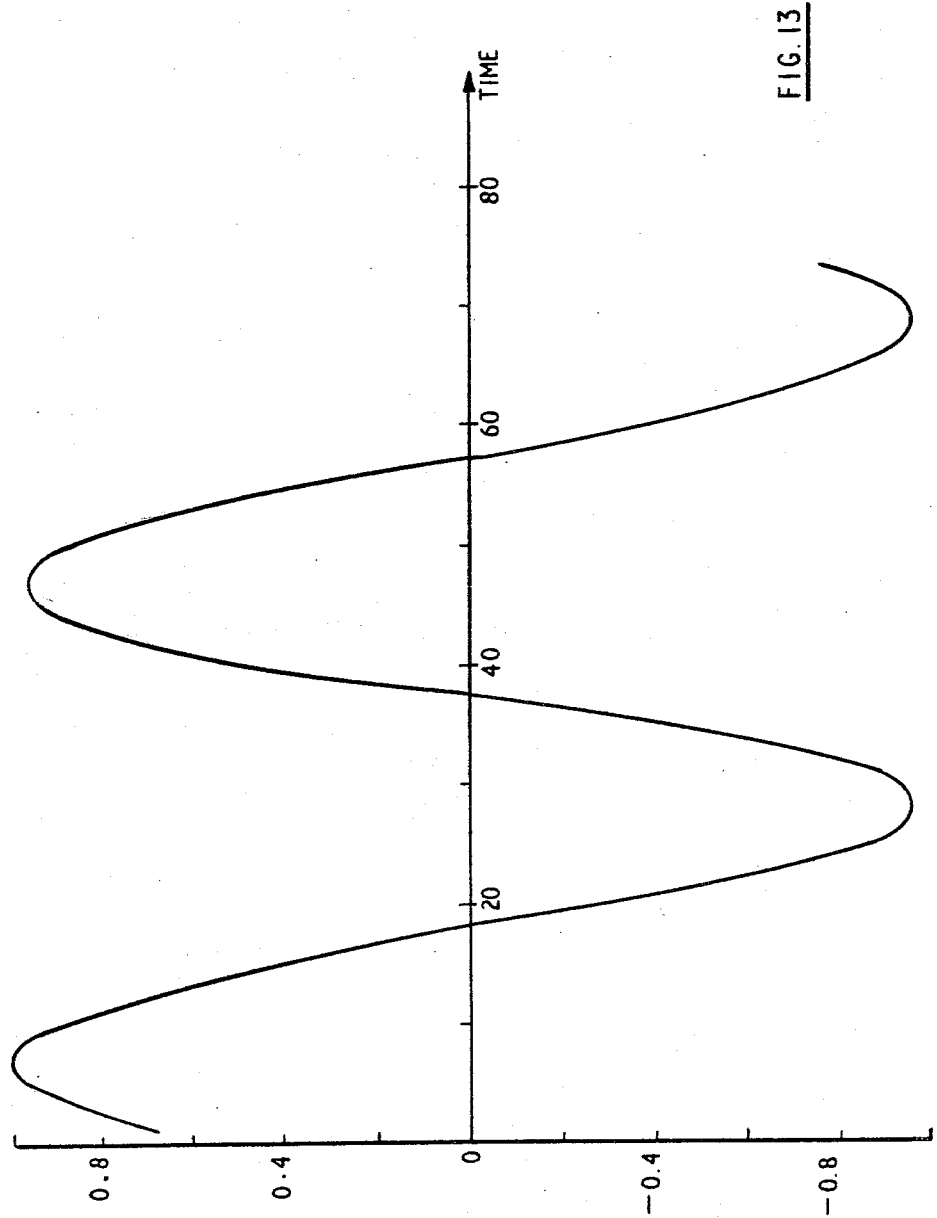
FIG. 13 shows the average of a portion of the FIG. 12 waveforms.
Figure 14:
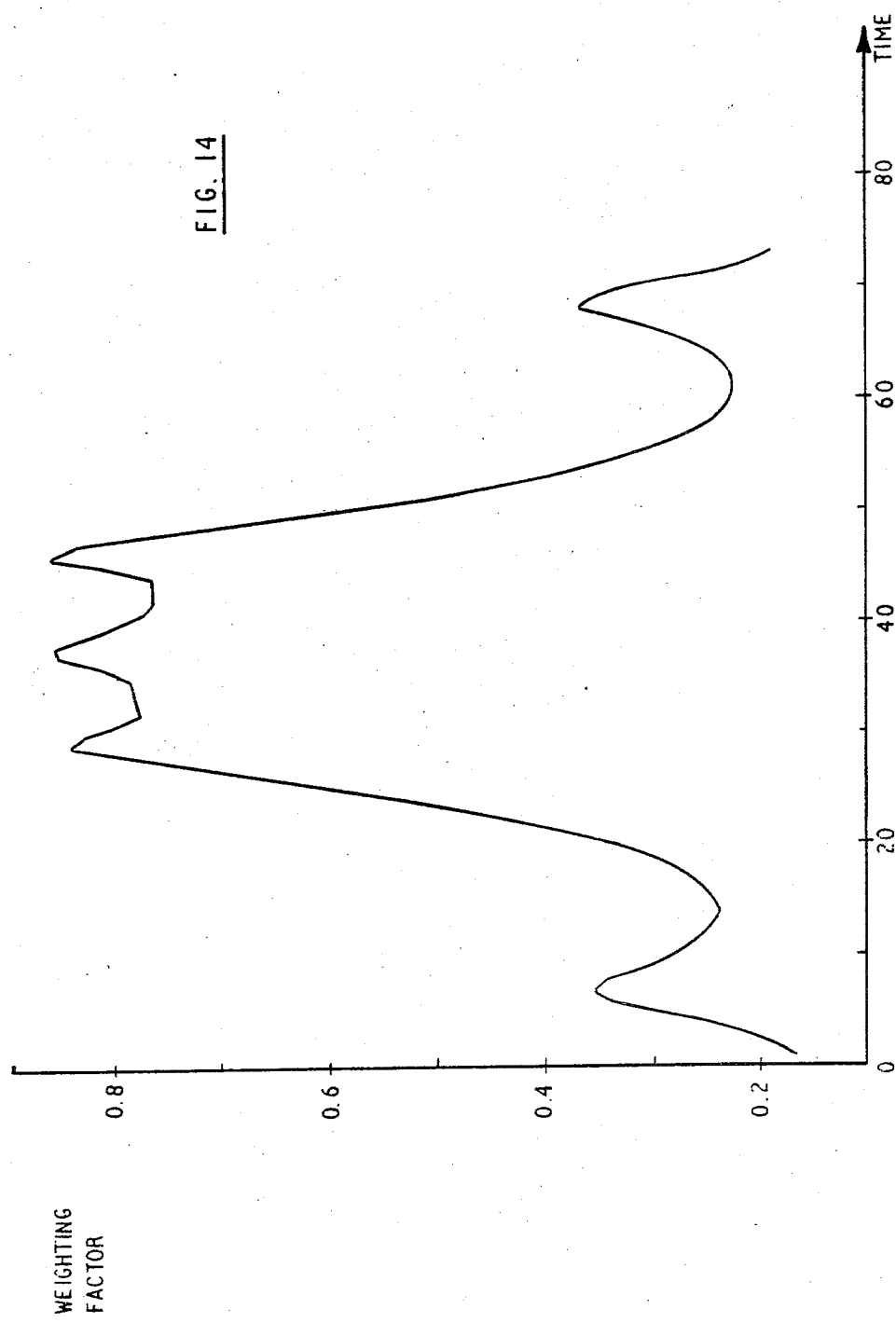
FIG. 14 shows a weighting factor derived from FIG. 12.
Figure 15:
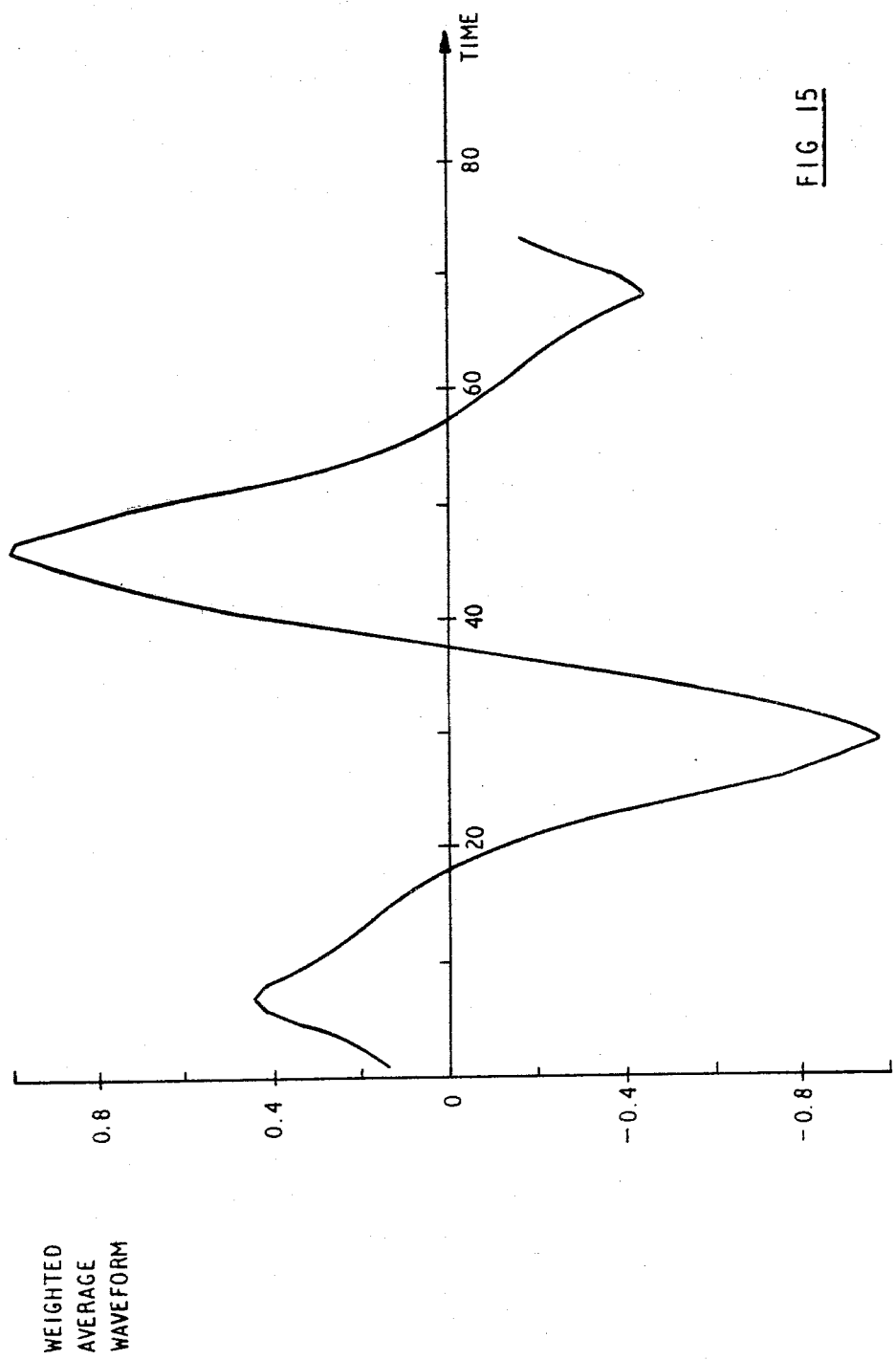
FIG. 15 illustrates an expected waveform derived from FIGS. 13 and 14.

First, each sequence computer simulation is performed to generate an envelope of all the possible waveforms from a magnetic disk head. This envelope should include all distorting effects such as adjacent code interference, adjacent track interference, noise, speed variations, head differences, magnetic differences, etc. The most significant distorting influence will probably be adjacent code, followed by speed (for disk applications). FIG. 12 shows how adjacent code can affect the 3 bit Miller code 000. FIG. 13 shows the average of the central portion of these waveforms. FIG. 14 shows a weighting function derived from the waveforms in FIG. 12 against FIG. 13. Finally, FIG. 15 shows the weighted average—the actual shape that will be used to characterize the envelope of one of the SAW transducers 85.

The expected waveforms or templates are tested with simulation and measurement. Modifications are then made to the original coding method and to the template profiles to exaggerate differences to provide improved discrimination by the SAW transducers.

Figure 16:
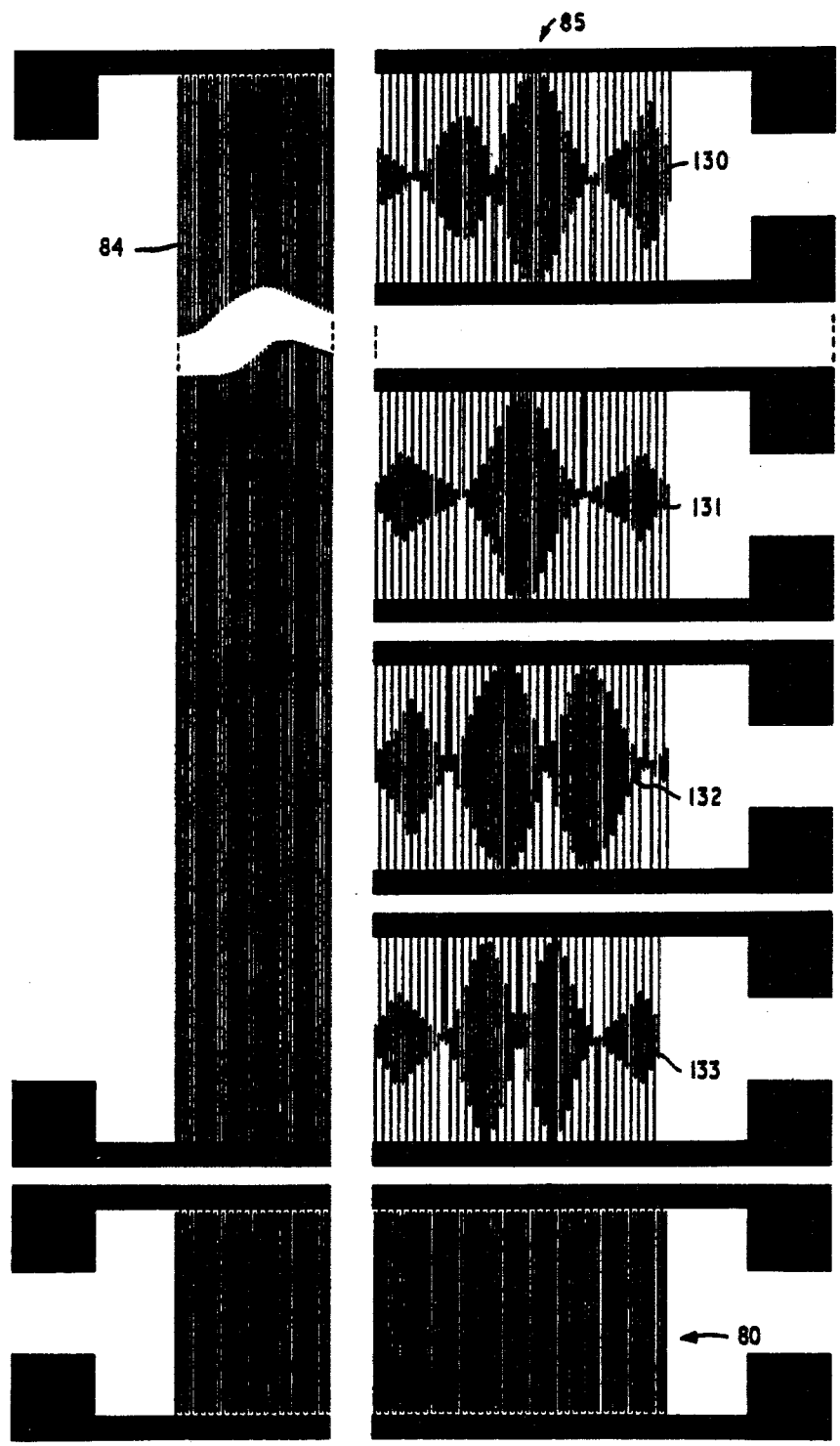
FIG. 16 shows a portion of the art work for the devices of a SAW Bank as in FIG. 9.

FIG. 16 shows a portion of a master artwork for the devices of a SAW Bank as illustrated schemciatlly in FIG. 9. For etching the electrodes and fingers of an actual SAW device this artwork is greatly reduced in size. In the upper part of FIG. 16 an input transducer 84 is shown together with four receiving transducers indicated generally by 85. Only four of the eight transducers are shown due to space limitations. These transducers were designed in accordance with the concepts illustrated in FIGS. 11 to 15 and it will be noted that the expected waveform envelopes 130, 131, 132 and 133 are of different shapes as enhanced by the weighting step. Also shown is the 100 MHz oscillator 80.

The description so far has been concerned mainly with data recognition apparatus using SAW devices. However, FIG. 8 and its accompanying description showed that a charge coupled (CCD) device could be designed to have signal recognition properties equivalent to those of SAW devices. Thus in FIG. 9, SAW Bank 77 may be replaced directly by a bank of eight CCD devices to perform the same waveform recognition.

Figure 17:
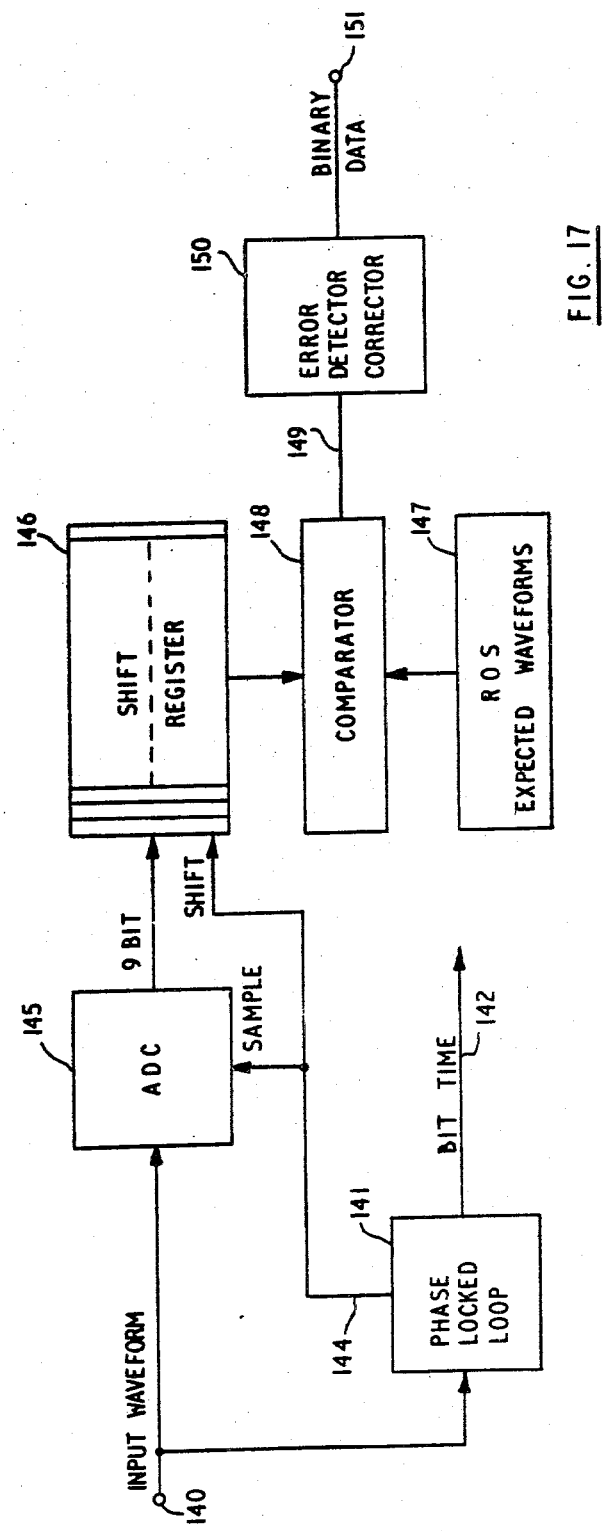
FIG. 17 is a block diagram of data recognition apparatus embodying the present invention using data processor recognition.

As an alternative to SAW or CCD devices, embodiments of the present invention may use a data processor as shown in block diagram form in FIG. 17. In FIG. 17 the input waveform applied to input terminal 140 may be the waveform representing binary data read from a magnetic disk or tape. A phase locked loop 141 extracts Bit Time as in FIG. 9, which is used to clock the recognition process. The output from the phase locked loop is a frequency multiplied BIT TIME 142 signal which samples the input waveform many times, such as fifty, per bit time.

Analog to digital converter 145 converts the sampled amplitudes of the input signal into a 9 bit parallel binary code which is fed to a 9 bit wide shift register 146 with a shift input each sample time. Assuming, as previously, that the waveform to be recognized represents three bits, then shift register 146 has 150 stages. Thus, shift register 146 holds 150, 9 bit coded samples.

As we have assumed that each waveform to be recognized represents 3 binary bits, then 8 expected waveforms are required for comparison purposes. Each of these 8 expected waveforms are stored in read only store (ROS) 147 as 150, 9 bit bytes.

At each bit time the contents of shift register 147 are transmitted to comparator 148 which also receives during each bit time the contents of ROS 147. Thus, during each bit time, comparator 148 is required to compare the 150, 9 bit bytes from shift register 146 representing the input waveform with each of the eight 150, 9 bit bytes from ROS 147 representing expected waveforms, and produces an output on bus 149 indicating the closest match. As discussed earlier, error detector/corrector 150 produces a binary output at terminal 151.

Comparator 148 is a microprocessor which is programmed to perform the required comparison operation. An advantage of using digital techniques is that the microprocessor can perform the necessary arithmetic for some suitable comparison algorithm such as a least squares fit.

What is claimed is:

1. Data recognition apparatus responsive to a serial input waveform, the input waveform including N different possible overlaping waveform sequences, each waveform sequence representing a plurality of m binary data bits, and having a period of m equal, or substantially equal bit times comprising:
   temporary storage means for storing the input waveform and having sufficient capacity to temporarily store any one of said waveform sequences;
   readable storage means for storing representations of N different waveform sequences expected to occur in the input waveform; and
   comparison means operable during each bit time for comparing the contents of said temporary storage means with the contents of said readable storage means and for indicating the closest match between each input waveform sequence and said expected waveform sequences.

2. Apparatus as in claim 1, including means coupled to receive said input waveform and to the input circuit of said temporary storage means for sampling the input waveform K times during each bit time, said comparison means being operable upon K×m samples during each bit time.

3. Apparatus as in claim 1, including clock means coupled to receive said input waveform for providing bit timing from said input waveform.

4. Apparatus as in claim 1, wherein said temporary storage means and readable storage means comprise $2^m$ delay devices in parallel.

5. Apparatus as in claim 4, wherein said delay devices comprise surface acoustic wave devices.

6. Apparatus as in claim 4, wherein said delay devices comprise charge coupled devices.

7. Apparatus as in claim 1, wherein said temporary storage means comprises a shift register, said readable storage means comprises a digital store, and said comparison means comprises a digital data processor.

8. Apparatus as in claim 1, including logic means coupled to the output circuit of said comparison means for detecting at each bit time when other than only one expected waveform sequence is indicated, and for providing an error signal.

9. Apparatus as in claim 8, wherein said logic means comprises error detection means for detecting when the same individual bit does not occur in each of m successive overlapping input waveform sequences recognized by said comparison means, and for providing an error signal.

10. Apparatus as in claim 8, wherein said logic means comprises error correction means for operating upon the recognized bits of m successive overlapping input sequences processed by said comparison means to provide error correction.

11. A method of recognizing data, the data being represented by a serial input waveform including N different possible overlapping waveform sequences, each waveform sequence representing a plurality of m binary bits, and having a period of m equal, or substantially equal bit times, comprising the steps of:
   temporarily storing the input waveform in temporary storage means having sufficient capacity to store any one of said waveform sequences;
   storing in readable storage means representations of N different waveform sequences expected to occur in the input waveform;
   comparing during each bit time the contents of said temporary storage means with the contents of said readable storage means and indicating the closest match between each input waveform sequence and said expected waveform sequences.

12. A method as in claim 11, including the steps of sampling the input waveform K times during each bit time, and comparing K×m samples during each bit time.

13. A method as in claim 11, comprising the steps of extracting bit timing from said input waveform.

14. A method as in claim 11, wherein said step of temporarily storing comprises storing in $2^m$ delay devices in parallel.

* * * * *